(No Model.)　　　　　　　　　　　　　　　　　5 Sheets—Sheet 1.
B. WILLIAMS.
MACHINE FOR MAKING WRAPPERS FOR NEWSPAPERS, &c.
No. 537,879.　　　　　　　　　　　　　Patented Apr. 23, 1895.

Witnesses　　　　　　　　　　　　　　　　Inventor
　　　　　　　　　　　　　　　　　　　　Benajah Williams
　　　　　　　　　　　　　　　　　　by Brown & Darby
　　　　　　　　　　　　　　　　　　　　　Attys

(No Model.) 5 Sheets—Sheet 4.

B. WILLIAMS.
MACHINE FOR MAKING WRAPPERS FOR NEWSPAPERS, &c.

No. 537,879. Patented Apr. 23, 1895.

Witnesses

Inventor
Benajah Williams
by Brown & Darby
Attys

(No Model.) 5 Sheets—Sheet 5.

B. WILLIAMS.
MACHINE FOR MAKING WRAPPERS FOR NEWSPAPERS, &c.

No. 537,879. Patented Apr. 23, 1895.

Witnesses
Inventor
Benajah Williams
by Brown & Darby
Attys.

THE NORRIS PETERS CO., PHOTO-LITHO., WASHINGTON, D. C.

UNITED STATES PATENT OFFICE.

BENAJAH WILLIAMS, OF CHICAGO, ILLINOIS.

MACHINE FOR MAKING WRAPPERS FOR NEWSPAPERS, &c.

SPECIFICATION forming part of Letters Patent No. 537,879, dated April 23, 1895.

Application filed May 28, 1894. Serial No. 512,793. (No model.)

*To all whom it may concern:*

Be it known that I, BENAJAH WILLIAMS, a citizen of the United States, residing at Chicago, in the county of Cook and State of Illinois, have invented a new and useful Machine for Making Wrappers for Newspapers, Periodicals, and the Like, of which the following is a specification.

This invention relates to machines for making wrappers for newspapers, periodicals and the like.

The object of the invention is to produce a machine for manufacturing wrappers for newspapers, periodicals, and the like, simple in construction and exceedingly effective in operation.

The invention consists substantially in the construction, combination, relative location and arrangement of parts, as shown in the accompanying drawings, as hereinafter more particularly described and finally pointed out in the appended claims.

Reference is had to the accompanying drawings, to the various views and reference signs appearing thereon, and wherein—

The same reference sign is used throughout the drawings to designate the same part wherever it occurs.

In carrying out my invention I provide a suitable framework, 1, for supporting the several mechanisms hereinafter described. The framework may be constructed of any suitable material and of any size desired. The roll, 2, of material from which the wrappers are made, is journaled in suitable brackets at the front end of the machine in position to be reeled off the roll thereof as the material is fed to the machine. As the blank material is fed from its roll it is guided over a suitable guide pulley 3, and from thence over a suitable drying table. A roll, 4, of cord, thread or string is suitably located adjacent to the same end of the machine as the roll of material 2. From its roll 4 the string or cord is feed through the conveniently arranged box, 5, containing, preferably in liquid form, an adhesive substance. As the string or cord passes through said box or receptacle 5 it becomes impregnated with the adhesive substance, and from thence the cord is fed to the drying table.

Figures 1, 2, 15:
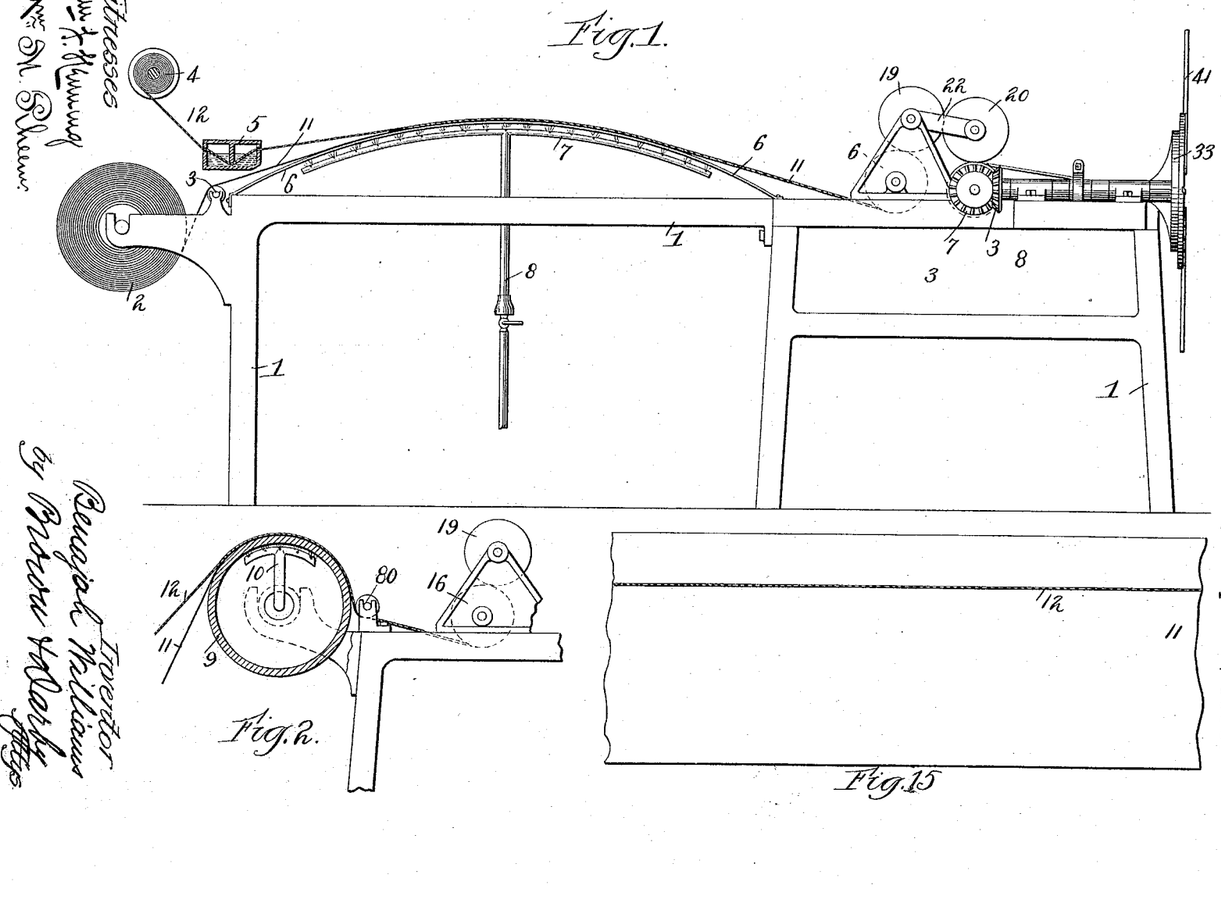
Figure 1 is a view in side elevation of the entire machine constructed in accordance with the principles of my invention.
Fig. 2 is a detail view, partly in side elevation, and partly in vertical section, showing a modified form of drying table.
Fig. 15 illustrates a portion of material from which the wrapper is made, with the string, cord, or thread applied thereto.

In the form shown in Fig. 1 the drying table consists of an extended curved portion, 6, in the form of a bridge. Table 6 may be constructed of any desired length or of material adapted to perform the function for which it is designed. Suitably located immediately beneath said table and adjacent to the line of travel of the string thereover is a heating device, 7, comprising a section of gas pipe receiving gas from any suitably arranged source through pipe 8.

In the form shown in Fig. 2 in place of the stationary table 6 having an extended curved surface, I may use a hollow cylinder, 9, journaled in a suitable manner and adapted to be heated on the inside by means of suitable gas jets or in any other suitable manner.

It will be observed that owing to the bridge form of the table first shown in Fig. 1 or the curved surface of the hollow cylinder as shown in Fig. 2, the string or cord with the adhesive material is brought in contact with the strip of blank material out of which the wrapper is made while the adhesive substance on the string is still damp. As the two pass together and in contact with each other over the heated table the string becomes attached to the material by the adhesion of the adhesive material and by the drying of the same during the travel over the heated table.

From the heating table, as above described, the strip of blank material which I designate by reference numeral 11 with the string or cord 12 applied thereto is fed to the printing rollers, which I will now proceed to describe.

Figures 3, 17:
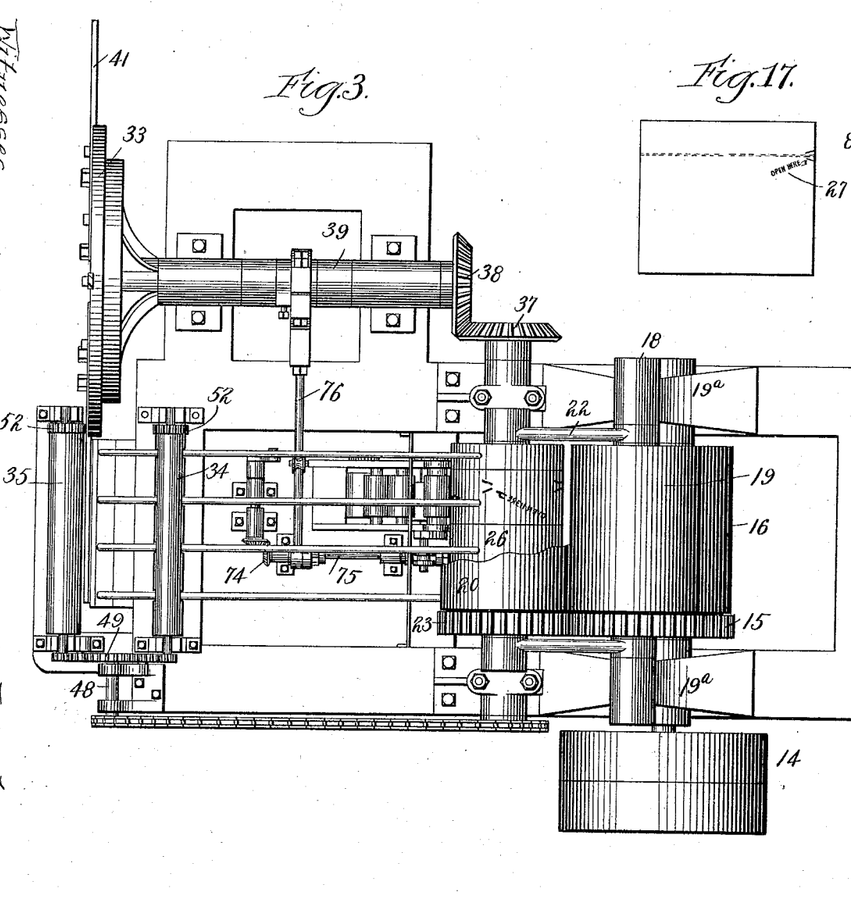
Fig. 3 is a plan view of that portion of the machine upon which are mounted the printing rollers and the cutting mechanism.
Fig. 17 is a similar view of the same, taken from the reverse side from that shown in Fig. 16.
Figures 4, 10, 11, 12:
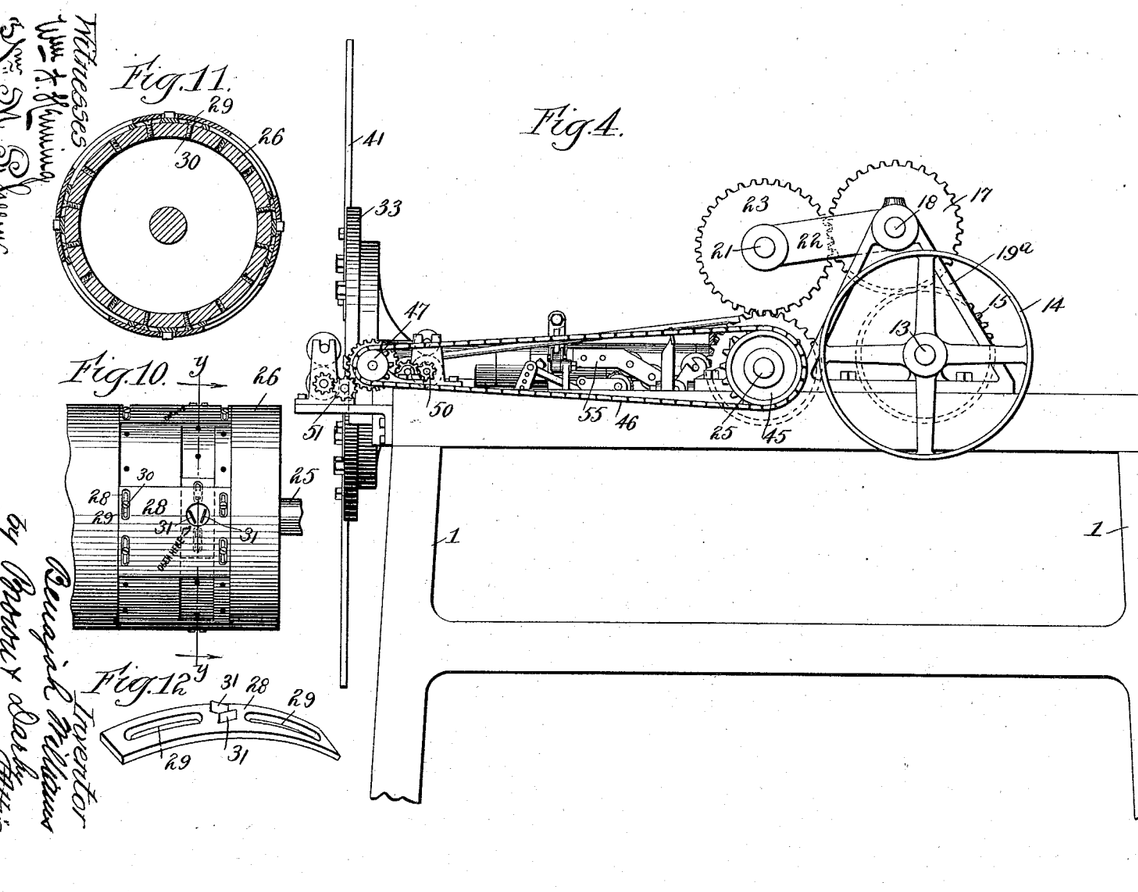
Fig. 4 is a view in side elevation of the construction shown in Fig. 3.
Fig. 10 is a view in side elevation of the printing and notching or slitting roll.
Fig. 11 is a transverse sectional view of the same taken on the line $y$, $y$, Fig. 10.
Fig. 12 is a detached detail view of the notching or slitting cutter.
Figure 5:
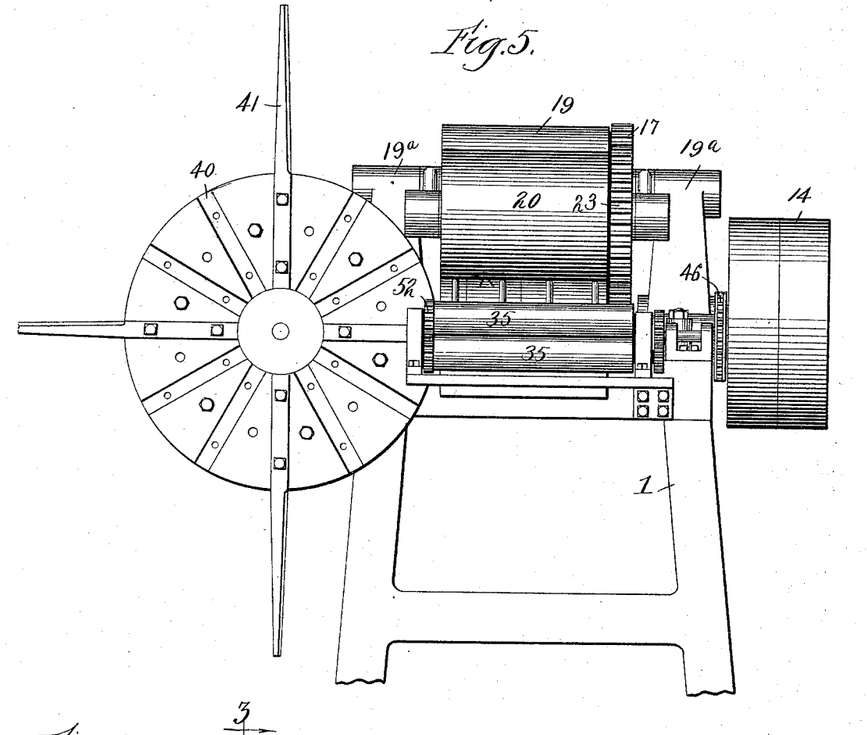
Fig. 5 is a rear end view of the machine.

Suitably mounted in the framework of the machine and transversely thereof is a main driving shaft 13 driven from any suitable source of power through pulleys 14. Mounted upon shaft 13 is a gear wheel 15 and also a guide roller 16. Gear wheel 15 meshes with a similar gear wheel 17, mounted upon a shaft 18, located above shaft 13 in suitable bearings in the bracket 19$^a$, bolted or otherwise secured to the framework. Upon said shaft 18 is also mounted a roller 19. A similar roller, 20, mounted upon a shaft 21, journaled in arms or links 22, extending rearwardly from shaft 18 is provided immediately above the printing roller presently to be described. Said roller 20 is indicated partially broken away in Fig. 3 in order to show the underlying printing roller presently to be described. Roller 20 is driven by the engagement of gear 23 mounted on shaft 21 with gear 17 as shown. The same gear wheel 23 meshes with a gear 24 on shaft 25 suitably journaled in the framework of the machine upon which is mounted a printing roller 26. By this construction is provided positive means for feeding the strip of blank material and properly guiding the same to the action of the printing roller, the strip 11 passing first under and around roller 16, then over roller 19, under and between roller 20 and the printing roller 26, as shown. (See more particularly Fig. 9.) Printing roller 26 is provided with a suitable peripheral groove, as shown in Figs. 10 and 11, to receive stereotyped plates therein, and also the notching or slitting cutters, presently to be described. Any desired printing matter may be thus provided, such as the name and address of the firm using the wrapper, the name of the paper or periodical, &c., or if desired any other mark or printing matter may be applied, as, for instance, such as is indicated at 27, Fig. 17.

The notching or slitting cutters are illustrated in detail in Fig. 12 and comprise a curved plate 28, having slots, 29, for the purpose of adjustment in the groove in roller 26, through which slots suitable securing devices, as bolts 30 may be passed in order to secure said cutter plates to the cylinder. Cutting points 31 are carried by plates 28 in order to stamp or cut slits or notches in the material out of which the wrapper is made, for a purpose that will presently appear more fully. In the form shown I provide two cutting points 31 for each plate. These cutting points may be arranged parallel with each other or angularly with respect to each other, as shown in Figs. 10 and 12. Cutter plate 28 is so arranged in the groove in roller 26 that the string or cord 12 attached to the strip of material 11 will pass therebetween. Said cutters, as will be readily understood, act as dies during the passage through the machine of the strip of material to stamp or cut the slit through the material, one on each side of the string or cord, as more fully shown in Fig. 16.

From the printing roller the strip of material is fed over a suitable supporting table, 32, to the action of the cutter head, 33. I may, if desired, and preferably in the form shown in the drawings (see Figs. 3 and 9) provide two pairs of feed rollers, 34, 35, one pair, 34, being arranged immediately in advance of the cutter; the other pair, 35, immediately after the cutter. In the rear end of table 32, I mount a blade 36, over which the strip of material is fed. (See Fig. 9.) This blade acts as a ledger blade which, co-operating with the cutter, acts on the principle of one jaw of a pair of scissors in conjunction with the other jaw.

Upon one end of shaft 25 of the printing roller I mount a beveled gear 37, which meshes with a similar gear, 38, upon a shaft 39, extending parallel with the line of feed of the strip of material through the machine. Upon the rear end of shaft 39 is mounted a cutter-head 33 to rotate in a plane transverse to the line of travel of the material. This cutter head is preferably in the form of a disk, as shown, and secured to the rear face thereof are the cutters. In the form shown the cutter head comprises a circular plate 42, adjustably bolted to disk 33, by means of slots 44 and bolts 43. Plate 42 is provided with a series of radial slots 40, adapted to receive the shanks of the cutter 41. In case of the radial cutters, 41, I prefer to construct the same of angular shape in cross section, as shown more clearly in Fig. 9. It is also obvious that in place of the rotary cutters above described, any arrangement of reciprocating cutters may be used to co-operate with ledger blade 36, to cut the wrappers from the strip of material.

The pairs of feed rolls 34, 35 are positively operated through the following mechanism: Mounted upon the end of shaft 25, opposite the end bearing beveled gear 37, is a sprocket gear, 45, adapted to drive the sprocket chain 46 extending rearwardly therefrom which passes around a sprocket 47, mounted on a short shaft 48, in the rear of the machine, which short shaft carries a gear wheel 49 which, through suitable gearing 50, 51, drives the lower member of each pair of gears 34, 35. (See Figs. 3 and 4.) Each member of each pair of gears 34, 35, has intermeshing gears 52, whereby the one drives the other, as clearly shown. By this arrangement it will be seen a positive feed is given to the strip of material from the time it engages the first pair of rolls, 16, 19, of the cutting mechanism until the pair of rolls 35 deliver the completed wrapper.

Figure 9:
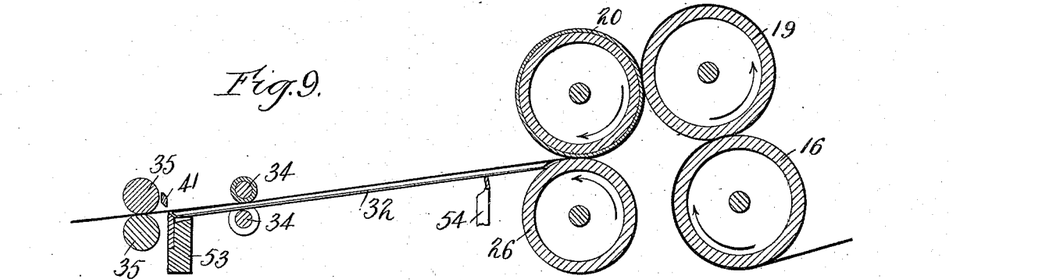
Fig. 9 is a view in vertical, central longitudinal section, illustrating the action of the cutting knife.
Figure 13:
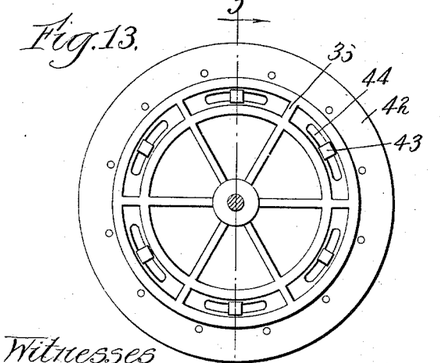
Fig. 13 is a rear view of the cutter supporting disk.
Figure 14:
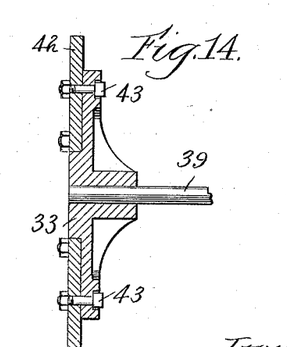
Fig. 14 is a vertical central sectional view of the same taken on the line $z$, $z$, Fig. 13.

Table 32, over which the strip of material passes from the printing roller to the delivery rollers and cutting knife comprises preferably a rack. (See more particularly Fig. 3.) The bars forming this open rack are suitably supported at the rear end of the machine upon a cross-bar 53 of the framework of the machine. The front ends of said bars comprising the rack are supported by a suitably arranged cross-bar 54, secured to the framework. (See Figs. 3 and 9.) The top surface of said bars are in a plane passing through a space between the pair of feed rollers 34, the lower member of said pair of rollers 34 being grooved, as shown, to receive therein said bars, as shown in Fig. 9.

I will now describe the inking apparatus for supplying ink to the printing roller.

Figure 6:
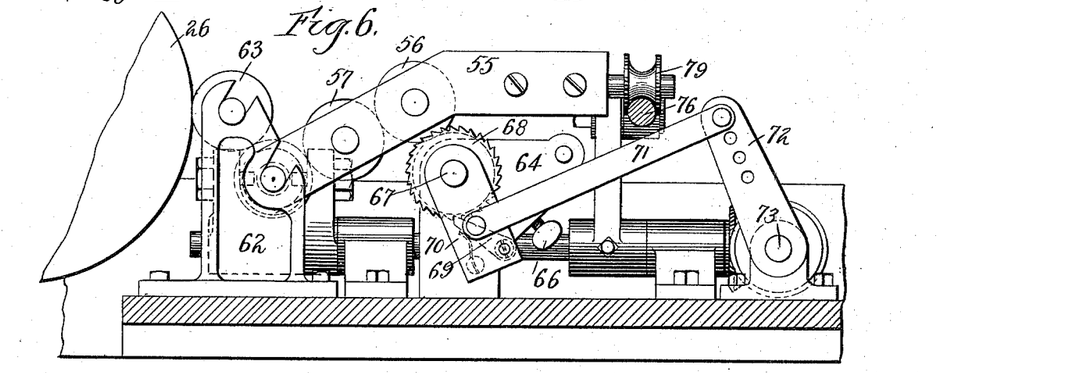
Fig. 6 is a detail view in side elevation, showing the inking apparatus.
Figure 7:
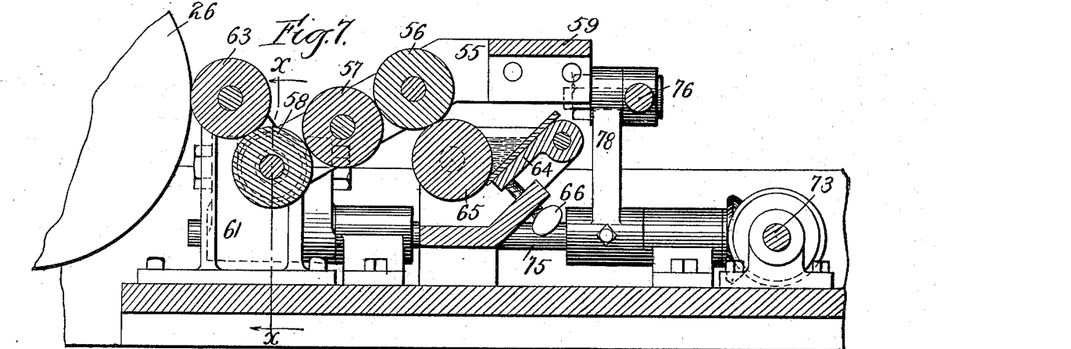
Fig. 7 is a vertical, central sectional view of the inking mechanism, as shown in Fig. 6.
Figure 8:
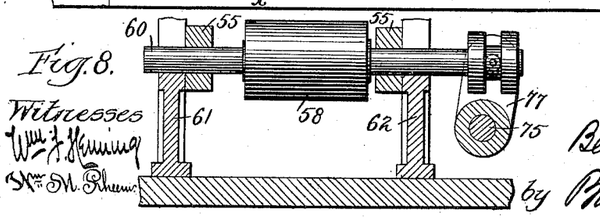
Fig. 8 is a vertical, transverse sectional view, taken on the line $x$, $x$, Fig. 7.

Reference numeral 55 designates a framework in which are loosely journaled rollers 56, 57 and 58. Said framework 55 comprises side bars and an end bar, 59, the side bars being hinged about the shaft 60. (See Fig. 8.) Shaft 60 is received in suitable journal boxes in uprights 61, 62, bolted or otherwise suitably secured on each side to the table of the machine. Said uprights or brackets 61, 62 are also provided with suitable journal boxes to receive the axle of a roller 63, said last mentioned roller lying in surface contact with printing roller 26, and rollers 56, 57, 58 and 63 being in surface contact with each other. These several rollers act as transferring devices for transferring and feeding the ink to the type of the stereotyped plates carried by the printing roller. The ink is carried in a suitable receptacle indicated at 64, and a roller, 65, is mounted to rotate through a suitable opening in the side of said receptacle, and is adapted to take ink therefrom and deposit the same upon the surface of roller 56, a rolling contact being maintained between said rollers 55 and 66. The ink is delivered from roller 56 to 57, from thence to roller 58, from thence to roller 63 to the stereotyped plates carried by the printing roller. An adjustable screw, 66 may be provided for adjusting the amount of opening in the side of, and hence the amount of flow from the ink receptacle. Rollers 56, 57, 58 and 63 are loosely mounted to rotate, and rotation is imparted thereto by the peripheral contact between the surface of printing roller 26 and roller 63, the rotary motion of 63 thus imparted being in turn imparted to the train of rollers 58, 57 and 56. In order to deliver ink to roller 56 from the ink receptacle 64 it becomes important to positively rotate the ink delivery roller 65. To accomplish this result I provide the following described mechanism: Mounted upon the shaft 67 of said ink delivery roller 65 is a ratchet wheel 68, adapted to be engaged by a spring-pressed pawl 69, carried upon a link or arm 70, pivoted at one end around axle 67 of ink delivery roller 65. Said arm 70 is rocked by means of a link 71 pivoted thereto at one end and at the other end pivoted to a crank arm 72, mounted upon a short shaft 73, extending transversely of the framework and rocked by gearing 74 intermediate shafts 73, and 75, which latter in turn is rocked from the cutter shaft 39 by means of a rod 76 and an eccentric and strap mounted on said shaft 39, as clearly shown in the drawings. Crank arm 72 may be provided with a series of holes, as shown at Fig. 6, in order to secure an adjustment of the length of stroke of link 71, and consequently of rocking arm 70, thus adjusting the amount of rotation of the ink delivery roller 65 upon each oscillation of shaft 73.

In order to even the spread of ink as it is delivered by the train of rollers, 56, 57, 58 and 63 to the printing roller 26, I reciprocate roller 58 endwise through its bearings by means of a crank arm 77 mounted to rock with shaft 75 and having a loose connection with shaft 60 of said roller 58. (See Fig. 8.) Eccentric rod 76 is connected to an arm 78 by which a rocking motion is imparted to 75. In order to still further evenly spread the ink, to reduce the friction of the parts and the wear, it is important that roller 56 which contacts with ink delivery roller 65, should be elevated out of contact therewith during the period said roller 65 is being positively rotated by the ratchet mechanism above described. In order to accomplish this result I secure a small friction roller 79 in cross bar 59 of the frame 55 in which said train of ink delivery rollers are journaled, adapted to rest upon eccentric rod 76. Consequently as eccentric rod 76 rises and falls under the action of its eccentric strap said arm 55 is also raised, the side bars thereof rocking about shaft 60 of roller 58, whereby roller 56 is periodically raised out of contact with ink delivery roller 65 during the time said delivery roller 65 is being positively rotated. By providing the slits 44 in the plate 42 to which the cutter carrying disk is secured, I provide a rotary adjustment of said plate or disk 42, thereby securing an accurate adjustment of the cutting knives. It will also be observed that from the angular shape of the straight cutters 41 and from the rotary motion of the cutter plate carrying said cutters, I am enabled to effect a shearing cut of the wrappers from the strip of material.

In case of the cylindrical heating table 9 a suitable guide roller 80 may be used to maintain the string, thread or cord in intimate contact with the strip of material 11, while the adhesive material is drying, as will be readily understood. If desired, a similar guide may be provided in case the bridge 6 is used, though ordinarily I have found that merely the bridge shape of said table is sufficient for all practical purposes.

It will be seen that for each rotation of the printing and slitting cutter carrying roller one rotation of the cutter head is effected, and hence the number of cutters carried by said cutter head is dependent upon the number of slitting cutting knives carried by the printing roller. In the form shown in the drawings four slit cutting plates, 28, are shown, attached to the printing roller, and consequently four knives or cutters 41 are provided for the cutter head, thus producing complete four wrappers upon each revolution of the machine. It is obvious that any other number may be provided for, and I do not desire to be limited in this respect to any particular number of wrappers which the machine is adapted to cut out at each revolution of the main driving shaft.

Figure 16:
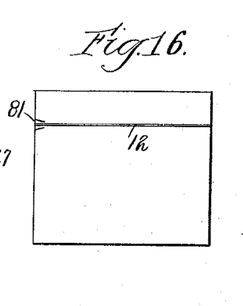
Fig. 16 is a view of the wrapper produced by the machine.

It will be understood from Fig. 16 that the wrapper cut from the strip of material is cut on a line transverse to the cord or string 12 and immediately adjacent to the slits or cuts made by the cutters on cutter plate 28, leaving at the point where the string is cut by cutters 41, and hence on the edge of the wrapper a short tongue 81. (See Fig. 16.) The object of this tongue is to enable the person to easily grasp the end of the string when the wrapper is used to wrap a paper, periodical or other article, to effect a rupture thereof to open said package without injuring the article wrapped therein.

The operation of my machine is as follows: A roll of material, 2, from which the wrappers are made is provided, and also a roll, 4, of thread, cord or string. The end of the roll 2 is laid over the heating table, 6 or 9, as the case may be, and is passed under, around and over roller 16, around and over roller 19, around roller 20 and between said roller and roller 26. The end of the string is first drawn through suitable openings in a receptacle, 5, carrying the adhesive substances, and is then carried over the heating table 6 or 9, as the case may be, whereby it is brought into contact with the sheet or strip of material 11, and maintained in contact therewith while being subjected to the action of the heat provided, whereby said string becomes permanently attached to the surface of the material. The machine is then set in operation and the positive feed of the train of rollers 16, 19 and 26 effects a feed of the material 11 with the string 12 applied thereto through the machine. By the rotation of roller 26 the desired printing is effected, as is also the slitting of the blank by means of cutters 31 carried by adjustable plates 28. The strip of blank material is then fed between feed rollers 34 over ledger blade 36 and between delivery rollers 35. The rotation of printing and cutting roller 26 effects a rotation of the cutter head 33, and the parts are so timed that just as that portion of the blank in which is a cut 81 (see Fig. 16) arrives upon the ledger plate 36, the cutter 41 descends and severs the wrapper from the strip of material. The rotation of roller 26 causes the rotation of the train of ink delivery rollers, 63, 58, 57, and 56, by the peripheral engagement of said rollers 63 and 26, whereby the ink is transferred from roller 56 to the printing roller 26, the ink being delivered to said roller 56 from roller 65 by the positive rotation of the latter in ink tank 64, the periodic rocking of frame 55, permitting the positive rotation of roller 65 without friction, and the periodic longitudinal reciprocation of roller 58 causing an even spreading of the ink.

Many variations and changes would readily suggest themselves to any person skilled in the art without departing from the spirit or scope of my invention. I do not desire, therefore, to be limited to the exact details shown and described; but, Having fully described my invention, its purposes, function, and mode of operation and a construction embodying the same, what I desire to claim as my own invention and to secure by Letters Patent of the United States is—

1. In a machine of the class described a printing roller, means for operating the same, a shaft operated in unison with said printing roller, having an eccentric, an eccentric rod operated thereby, an ink delivery roller, a ratchet mounted thereon, means operated by said eccentric rod for periodically operating said ratchet, whereby said ink delivery roller is periodically and positively rotated, a train of ink transferring rollers and means also operated by said eccentric rod for reciprocating one of said train of transferring rollers longitudinally; as and for the purpose set forth.

2. In a machine of the class described a printing and slit cutting roller, means for positively rotating the same, a shaft, gearing intermediate said shaft and roller for operating the former from the latter, a cutter head carried by said shaft, comprising a slotted plate, a cutter disk adapted to be secured to said cutter plate adapted to carry cutters; as and for the purpose set forth.

3. In a machine of the class described a printing and slit cutting roller, means for supplying ink to said roller, means for attaching a string or cord to the blank of material, feed rollers and means for positively operating said rollers in combination with a cutter head comprising a radially slotted cutter carrying disk, a slotted plate to which said disk is adapted to be secured, whereby the same is capable of rotary adjustment, and severing cutters adapted to be received in said radial slots, and a ledger blade over which the material is adapted to be fed, as and for the purpose set forth.

4. In a machine of the class described, means for supporting and feeding the blank material to be operated upon, a pasting apparatus, means for feeding a thread or cord therethrough, a heating table over which said blank material is fed and means for bringing the pasted thread or cord into contact with said blank material, simultaneously with its travel over said heating table; as and for the purpose set forth.

5. In a machine of the class described a supporting and feeding mechanism for a strip of blank material, a curved table over which the blank material is fed, means for heating said table, means for applying an adhesive substance to a thread or cord, arranged adjacent to the feed in the end of the machine, and in a plane lower than the top surface of said curved table, and means for feeding said thread or cord, whereby said thread or cord after receiving said adhesive substance is simultaneously applied to said strip of material and subjected to heat, thereby becoming securely attached thereto, as and for the purpose set forth.

6. In a machine for making newspaper wrappers, means for applying an adhesive substance to a thread or cord, mechanism for feeding the blank material, out of which the wrapper is made, an arching table over which said material is adapted to be fed, the upper surface of which is arranged in a plane higher than the adhesive applying devices, means for heating said table, whereby the thread or cord with the adhesive substance thereon is simultaneously applied to and dried on said blank material, in combination with severing mechanisms, and means for operating the same; as and for the purpose set forth.

7. In a machine of the class described, means for supporting a roll of material at the feed-in end of the machine, a roll of thread or cord arranged adjacent thereto, a receptacle adapted to contain an adhesive substance and through which said cord or string is adapted to pass, also arranged adjacent to the feed-in end of the machine, a stationary arching table over which the material and the thread or cord are adapted to be fed, means for applying heat to the under surface of said table, the upper surface of said table arranged in a higher plane than the said receptacle, whereby the thread or cord with the adhesive substance applied thereto is simultaneously applied to the surface of said material and subjected to heat, cutters arranged to slit the edges of the strip of material, a severing cutter and means for feeding the strip of material and for operating the slit cutting and severing devices; as and for the purpose set forth.

8. In a machine of the class described and in combination with means for securing a thread or cord to a strip of material and for feeding said strip with the thread or cord attached thereto, of a slit cutting mechanism arranged in the path of feed thereof having cutters arranged to slit the strip of material adjacent to the thread or cord, and a severing cutter arranged to sever a wrapper from said strip adjacent to the slits therein; as and for the purpose set forth.

9. In a machine of the class described, and in combination with means for applying a thread or cord longitudinally with respect to a strip of blank material and for feeding the same, a slit cutting mechanism comprising a pair of cutters, so relatively arranged that the thread or cord passes therebetween as the strip of material is fed through the machine, said cutters being inclined with respect to the direction of travel of said strip and a severing cutter arranged to sever a wrapper from said strip adjacent to the slits therein; as and for the purpose set forth.

10. In a machine of the class described and in combination with means for securing a thread or cord to the surface of a strip of blank material, and for feeding the same, a roller arranged transverse to the line of feed of said strip provided with a groove, a plate adjustably mounted in said groove carrying cutters arranged to make an inclined cut or perforation in said strip on each side of the thread or cord attached thereto, and a severing cutter arranged to sever a wrapper from said strip adjacent to said inclined cuts or perforations; as and for the purpose set forth.

11. In a wrapper machine, and in combination with means for securing a thread or cord to a strip of blank material and for feeding a roller arranged transverse to the line of feed thereof carrying cutters arranged to slit said strip adjacent to said thread or cord, printing devices carried by said roller, arranged to print said strip adjacent to said slits, means for supplying ink to said printing devices, and a cutter arranged to sever a slitted and printed wrapper from said strip; as and for the purpose set forth.

12. In a machine of the class described, and in combination with means for attaching a thread or cord to a strip of blank material, a roller carrying printing and cutting devices arranged to print and to slit said strip adjacent to the said thread or cord, feed rolls for feeding said strip and a severing cutter arranged to sever a wrapper from said strip at the point where said slits are made; as and for the purpose set forth.

13. In a machine of the class described and in combination with means for securing a thread or cord upon a strip of blank material longitudinally with respect thereto, a roller provided with printing and slit cutting devices, arranged to print and slit said strip adjacent to said cord or thread, a cutter arranged to sever a wrapper from said strip, feed rolls arranged intermediate said roller and severing cutter, means for actuating the same, and delivery rolls for the detached wrapper; as and for the purpose set forth.

14. In a machine of the class described and in combination with means for attaching a thread or cord to a strip of blank material and for feeding the same, a roller carrying printing and cutting devices arranged to print and slit said strip adjacent to the thread or cord attached thereto, means for rotating said roller, a rotary severing cutter arranged to sever a wrapper from said strip adjacent to the slits therein, gearing intermediate said roller and rotary cutter for actuating the latter from the former; as and for the purpose set forth.

15. In a machine of the class described and in combination with means for attaching a thread or cord to a strip of blank material, means for feeding the said strip with the thread or cord attached thereto, means for printing and slitting said strip adjacent to said thread or cord, a ledger blade over which said strip is adapted to be fed, and a cutter arranged to co-act with said ledger blade to sever a wrapper from said strip on a line adjacent to the slits therein; as and for the purpose set forth.

16. The process of manufacturing wrappers for newspapers, periodicals and the like, which consists in applying an adhesive substance to a thread or cord, then simultaneously applying said thread or cord to the surface of a strip of blank material and subjecting the same to heat, whereby said adhesive substance is dried and said thread or cord is permanently attached to said strip, then slitting said strip on opposite sides and adjacent to said thread or cord, and, finally, severing a wrapper therefrom on a line transverse thereto and adjacent to the ends of said slits; as and for the purpose set forth.

In witness whereof I have hereunto set my hand this 24th day of May, 1894.

BENAJAH WILLIAMS.

Witnesses:
S. E. DARBY,
M. I. CAVANAGH.